United States Patent [19]

Fuzita et al.

[11] Patent Number: 4,642,838

[45] Date of Patent: Feb. 17, 1987

[54] BEARING DEVICE OF BENDING AND STRETCHING TYPE WINDSHIELD WIPER

[75] Inventors: Kazuhiro Fuzita, Toyohashi; Kazunori Nishizawa; Shinzi Imamura, both of Kosai, all of Japan

[73] Assignee: ASMO Co., Ltd., Kosai, Japan

[21] Appl. No.: 791,730

[22] Filed: Oct. 28, 1985

[30] Foreign Application Priority Data

Oct. 29, 1984 [JP] Japan .......................... 59-163376[U]

[51] Int. Cl.[4] ............................ A47I 1/00; B60S 1/26

[52] U.S. Cl. ............................ 15/250.21; 15/250.23

[58] Field of Search ........... 15/250.21, 250.23, 250.30, 15/250.13

[56] References Cited

U.S. PATENT DOCUMENTS

| | | | |
|---|---|---|---|
| 2,516,808 | 7/1950 | Seger | 15/250.21 |
| 3,570,039 | 3/1971 | Ichinose et al. | 15/250.13 |
| 3,590,415 | 7/1971 | Mori | 15/250.21 |
| 3,651,699 | 3/1972 | Thomas et al. | 15/250.21 X |

FOREIGN PATENT DOCUMENTS

| | | | |
|---|---|---|---|
| 2236643 | 2/1974 | Fed. Rep. of Germany | 15/250.21 |

*Primary Examiner*—Peter Feldman
*Attorney, Agent, or Firm*—Burns, Doane, Swecker & Mathis

[57] ABSTRACT

A bearing device of the bending and stretching type windshield wiper having a gear train (7, 8, 9) to interlink the wiper link output shaft (2) and the wiper arm head shaft (3), wherein the improvement comprising, a wiper pivot (4) having the first installing hole on the center thereof, and fixed to the body (1) of a car; a stationary gear member (7) extrudingly providing a boss part (71) which has a bearing hole in the center thereof, the stationary gear member (7) is rigidly secured with the wiper pivot (4), and of which the boss part (71) is inserted in the first installing hole of said wiper pivot (4); a bearing member (10) of a cylinder form; and a gear housing member (5) extrudingly providing a cylinder part (51) which has the second installing hole on the center thereof, the cylinder part (51) of the gear housing member (5) is inserted in the bearing hole of the stationary gear member (7) together with the bearing member (10) and the wiper link output shaft (2) is fixedly secured in the second installing hole of the gear housing member (5).

8 Claims, 4 Drawing Figures

1
11
41
4
7
52
10
71
2
6
21
51
5
8
11
14
3
9
5A
5B

BEARING DEVICE OF BENDING AND STRETCHING TYPE WINDSHIELD WIPER

BACKGROUND OF THE INVENTION

The invention relates to a bearing device of a bending and stretching type windshield wiper to wipe the window glasses of the vehicles.

DESCRIPTION OF THE PRIOR ART

Conventionally, a bending and stretching type windshield wiper of which object is to increase the area of the glass to be swept by the wiper blade is disclosed by U.S. Pat. No. 3,570,039, where a gear train is laid between the output shaft of the wiper link and the shaft for installing the wiper arm head. However, there was a problem in this prior art that a swept angle by the wiper blade was largely varied between the dry glass and the wet, because a boss part of a gear housing containing the gear train was axially connected with driving gear by a projection means and a groove, and a radial gap was liable to arise between them. Moreover, there was a limitation of life and diameter of a shaft of a stationary gear of the gear train, because of a relative rotation of the stationary gear shaft for the boss part of the gear housing which was turned in an inner surface of a driving gear housing worked as a wiper pivot, and a large surface pressure generated on the outer periphery of the stationary gear shaft.

SUMMARY OF THE INVENTION

An object of the present invention is to provide a bearing device of the bending and stretching type windshield wiper where wear and tear are much reduced.

An another object of the invention is to provide a bearing device of the bending and stretching type windwhield wiper of which the variations of swept angles are very smaller at the points of the wiper blades.

A further object of the invention is to provide a bearing device of the bending and stretching type windshield wiper which is possible to separate an output shaft of wiper link from a gear housing member, and that is very convenient to mount the gear housing member on an autobody.

An even further object of this invention contemplates the provision of a bearing device of the bending and stretching type windshield wiper of which a stationary gear member is satisfactorily slidden on an inner surface of cylindrical part of the gear housing member, even when the gear housing member is made by aluminum diecasting and the stationary gear member is made of usual materials such as sintered alloy, synthetic resin, or metals.

Still a further object of the present invention is the provision of the bending and stretching type windshield wiper having an exceedingly small size gear housing member, which is readily adaptable for use on vehicles.

Other and further object of this invention will become obvious upon an understanding of the illustrative embodiments about to be described or will be indicated in the appended claims, and various advantages not reffered to herein will occur to one skilled in the art upon employment of the invention in practice.

Figure 1:
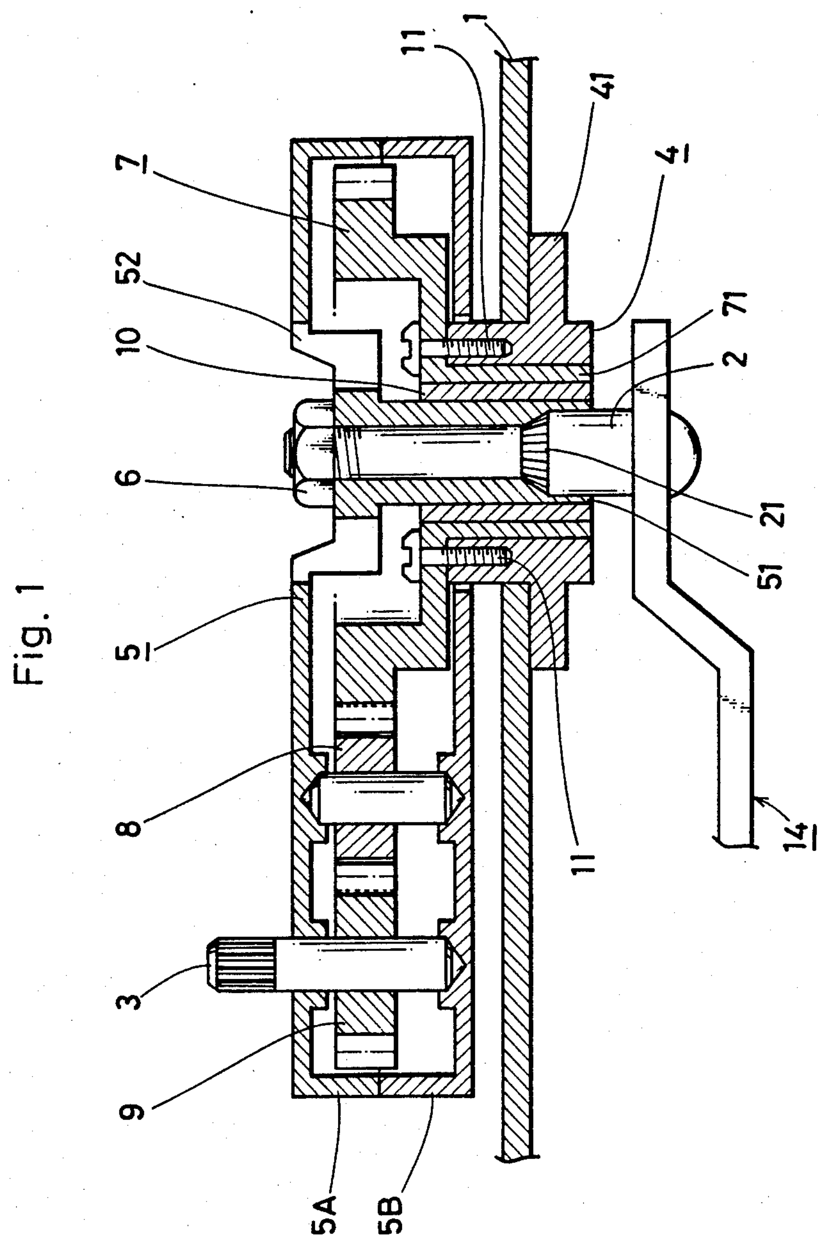
FIG. 1 is a grossly enlarged sectional view of a gear train part of the first embodiment of the invention.

DETAILED DESCRIPTION OF PREFERRED EMBODIMENTS (The First Embodiment)

Referring now to the drawings, the first embodiment of the invention will be described.

In FIG. 1, numeral 1 designates the body of a car. Numeral 2 designates a wiper link output shaft, which is inserted into a cylinder part 51 projectively provided with a gear housing member 5 for guiding the output shaft 2, and the output shaft 2 is fixedly connected with the gear housing member 5 by its tapered serration 21 and an upper end nut 6. The gear housing member 5 is made up from upper and lower members 5A and 5B secured together by fastening means (not shown) into a two-part hollow arm. A bearing member 10 of a cylinder form is force-fitted on the outer periphery of the cylinder part 51 of the gear housing member 5. Numeral 7 designates a stationary gear member, which is projectively provided with a boss part 71 in the center of gear portion thereof. The cylinder part 51 of the gear housing member 5 is rotatably supported in an inner bearing surface of the boss part or portion 71 of the stationary gear member 7, through the bearing member 10. The stationary gear member 7 forms a gear train with driven gears 8 and 9 which are rotatably supported in the gear housing member 5. In the embodiment, the diamter of the gear 7 is about three times as the respective diameter of the gears 8 and 9. Numeral 4 designates a wiper pivot, which is forcedly fitted on an outer periphery of the boss part 71 of the stationary gear member 7. In the first embodiment, the wiper pivot 4 and the stationary gear member 7 are fixed each other by many screws 11 in order to obtain more reliable fixation. The same effect may be attained by un-illustrated knock-pins, revets and so on. The wiper pivot 4 has a flange part 41, and is directly fixed with the body 1 of a car by the flange part 41. It is also available that the wiper pivot 4 is indirectly fixed to the body 1 through a bracket rigidly secured with the flange part 41. Numeral 3 designates a wiper arm head shaft, and the shaft 3 serves as a shaft of the driven gear 9, too.

Figure 3:
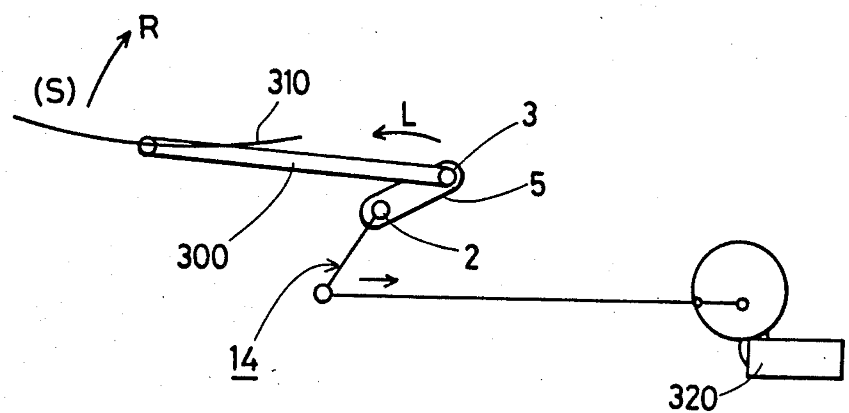
FIG. 3 is a schematic elevation indicating a whole organization of the bending and stretching type wiper system concerning the invention.
Figure 4:
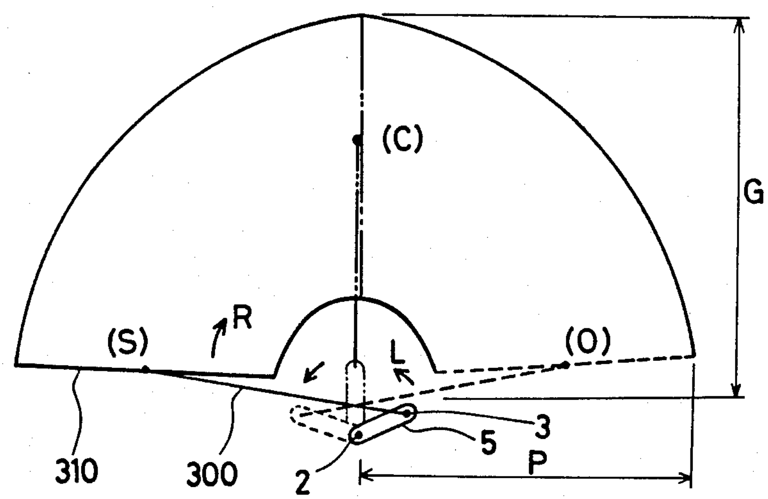
FIG. 4 is a diagrammatic view showing the parts in a plurality of position.

As shown in FIGS. 3 and 4, a wiper blade 310 is connected to the wiper arm head shaft 3 through a wiper arm 300. On the other hand, the wiper link output shaft 2 is connected to a wiper motor 320 including an electric motor and reduction gears, through the wiper link 14.

As indicated in FIG. 1, working holes 52 are made on the gear housing member 5, and the screws 11 are easily fastened or un-fastened from outside of the gear housing member 5 through these holes 52. The operation holes 52 are usually closed by a cover not shown in FIG. 1.

(Operation of the First Embodiment)

In operation, the wiper motor 320 is energized, and the shaft of which rotates and the wiper link output shaft 2 is rocked reciprocally by the wiper motor 320 through the wiper link 14, and the gear housing member 5 is swinged by the output shaft 2. The wiper link output shaft 2 rocks with the cylinder part 51 of the gear housing member 5 and the bearing member 10, relatively to the boss part 71 of the stationary gear member 7. An inner periphery of the boss part 71 is the only one bearing surface which contacts with an outer periphery of the bearing member 10, the diameter of which is larger than the wiper link output shaft 2, because the stationary gear member 7 is fixed to the body 1 of car through its boss part 71 and the wiper pivot 4, and the stationary gear member 7 does not contact with the wiper link output shaft 2.

Now, the gear housing member 5 is turned, for example to un-clockwise, then the stationary gear member 7 rotates clockwise relative to the housing member 5, and the driven gear 8 which is meshed with the stationary gear member 7 rotates unclockwise, the driven gear 9 which is meshed with the gear 8 rotates clockwise, then the wiper arm head shaft 3 turns clockwise with the driven gear 9, and the wiper arm 300 is swung clockwise. Therefore, the wiper arm head shaft 3 turns clockwise, as the shaft 3 is revolved unclockwise with the gear housing member 5. As shown in FIG. 4, the gear housing member 5 and the wiper arm 300 are angled relative to each other at the start point s. While the gear housing member 5 turns about 60° to unclockwise and reaches at the center position C, the wiper arm 300 rotates about 180° to clockwise as it revolves about 60° to unclockwise, and the wiper arm 300 reaches at the same center position C with the resultant clockwise rotation of 120°, and the gear housing member 5 and the wiper arm 300 are aligned and stretched. During the further 60° unclockwise rotation of the gear housing member 5, the wiper arm 300 reaches the open position O, because of the 180° clockwise rotation and the 60° unclockwise revolution of itself, so the gear housing member 5 and the wiper arm 300 are in the bending condition. Along this line, a broader wiping range G is accomplished in the center position C, where the gear housing member 5 and the wiper arm 300 are in the stretching condition.

(The Second Embodiment)

Figure 2:
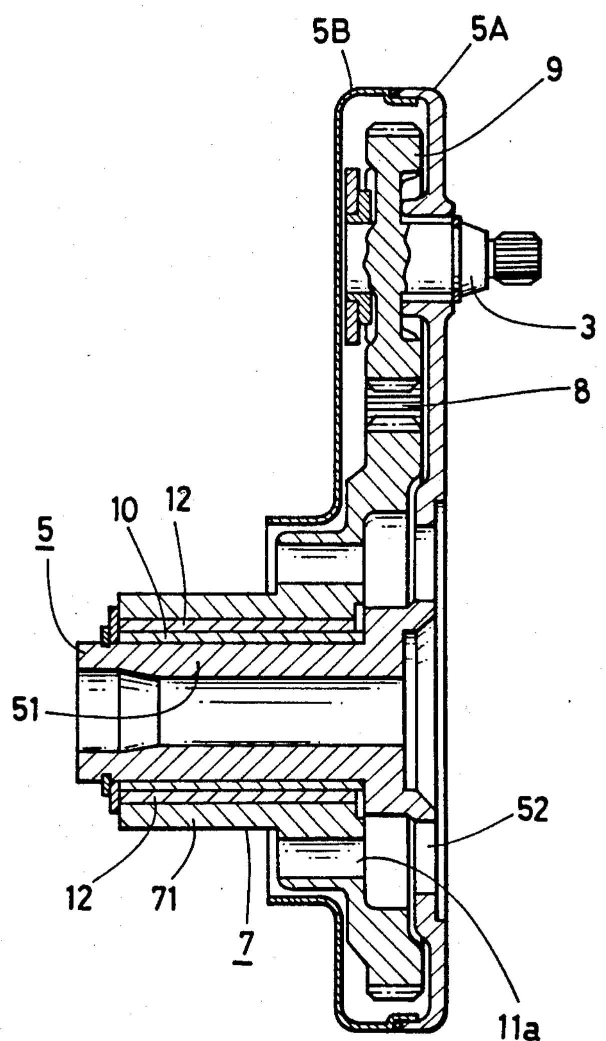
FIG. 2 is a view similar to FIG. 1 showing the second embodiment.

In the second embodiment indicated in the FIG. 2, a bearing member 10 of a hollow cylindrical form is fixed by force fit on an outer periphery of the cylinder part 51 of the gear housing member 5. The gear housing member 5 which have continuously the cylinder part 51 and the upper member 5A, is made of aluminum diecasting, and the bearing member 10 is made of optional material such as sintered metal, synthetic resin or metals. Another bearing member 12 of a hollow cylindrical form is forcedly fitted in an inner periphery of the boss part 71 of the stationary gear member 7. The bearing member 12 is also made of sintered metal, synthetic resin, or metals. The cylinder part 51 of the gear housing member 5 is rotatably supported by the stationary gear member 7 at its boss part 71, through the both bearing member 10 and 12. Moreover, the stationary gear member 7 is fixedly secured to the wiper pivot not shown in FIG. 2, by pins to be forcedly inserted in holes 11*a*, through working holes 52. The stationary gear member 7 is made of optional materials such as sintered metal, synthetic resin, or metals. In the case the stationary gear member 7 can be made of lubricative synthetic resin, the gear housing member 5 may be successfully rotated in the inner periphery of the stationary gear member 7, without the bearing member 12.

The gear housing member 5 is rectangularly formed something like a lunch box with the member 5A and 5B, the lower member 5B of which is made of a steel plate.

The gear housing member 5 keeps the stationary gear member 7 and the driven gears 8 and 9 between the members 5A and 5B, and the gear housing member 5 further maintains gear pitches of these three gears 7, 8 and 9, and holds grease therein. The wiper link output shaft (2) un-indicated in FIG. 2 will be installed in the center hole of the cylinder part 51 of the gear housing member 5. An axis of the driven gear 8 which meshes with the driven gear 9 and the stationary gear member 7, is aparted from the line connecting the axes of the gears 7 and 9. Therefore, the driven gear 9 and the stationary gear member 7 are closely approached, and the length of the gear housing member 5 is shortened.

The bearing member 10 of a cylindrical form is forcedly fitted on the outer periphery of the cylinder part 51, so that the bearing member 10 is not rotated by drive force or load from the bearing member 12 but fixedly secured on the cylinder part 51. A measurement relation between the bearing member 10 and 12 is made as the same with a regular specific of bearing surfaces and shaft holes.

An operation of the second embodiment is like the operation of the first embodiment, while the cylinder part 51 is reciprocally turned by the output shaft 2 of the wiper link 14, the gear housing member 5 is swung, and the driven gear 9 receives rotation force from the stationary gear member 7 by way of the driven gear 8, and the driven gear 9 is rotated with the wiper arm head shaft 3. The wiper arm 300 is reversely oscillated to and fro, for the swing direction of the gear housing member 5. Consequently, the wiper arm 300 and the gear housing member 5 make a bending and stretching motion.

An advantage is realized by the second embodiment that a sense of stability is given to the drivers of cars, because the axial length of the gear housing member 5 is so short that the swing motion of this housing member 5 may be hidden under a lower frame of the window and is not seen.

As this invention may be embodied in several forms without departing from the sprit of essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds are threfore intended to embraced by the claims.

What is claimed is:

1. A bearing device of the bending and stretching type windshield wiper having a gear train to interlink the wiper link output shaft and the wiper arm head shaft, wherein the improvement comprising, a wiper pivot having a first installing hole on the center thereof, and fixed to the body of a car; a stationary gear member extrudingly providing a boss part which has a bearing hole in the center thereof, said stationary gear member is rigidly secured with said wiper pivot, and of which the boss part is inserted in the first installing hole of said wiper pivot; a bearing member of a cylinder form; and a gear housing member extrudingly providing a cylinder part which has a second installing hole on the center thereof, the cylinder part of said gear housing member is inserted in the bearing hole of said stationary gear member together with said bearing member and the wiper link output shaft is fixedly secured in the second installing hole of said gear housing member.

2. The bearing device of the bending and stretching type windshield wiper claimed in claim 1, wherein the wiper link output shaft is coupled by tapered means in the second installing hole of said gear housing member.

3. The bearing device of the bending and stretching type windshield wiper claimed in claim 1, wherein said bearing member is forcedly fitted on the outer periphery of the cylinder part of said gear housing member.

4. The bearing device of the bending and stretching type windshield wiper claimed in claim 1, wherein another bearing member of cylinder form is forcedly fitted in the inner periphery of the bearing hole of said stationary gear member.

5. A bending and stretching type windshield wiper comprising a wiper pivot having a first installing hole on the center thereof, and said wiper pivot is fixed to the body of a car; a stationary gear member extrudingly provided a boss part which has a bearing hole in the center thereof, said stationary gear member is rigidly secured with said wiper pivot, and of which the boss part is inserted in the first installing hole of said wiper pivot; a bearing member of a cylinder form; a hollow gear housing member extrudingly providing a cylinder part which has a second installing hole on the center thereof, the cylinder part of said gear housing member is inserted in the bearing hole of said stationary gear member together with said bearing member; a wiper link output shaft interlinked with the wiper motor through the wiper link, said wiper link output shaft is fixedly secured in the second installing hole of said gear housing member; a first driven gear having wiper head' shaft which is connected with a wiper arm, said first driven gear rotatably supported in said gear housing member; and a second driven gear which is rotatably supported in said gear housing member, and meshed with said first driven gear and said stationary gear member inside of said gear housing member, an axis of said second driven gear is aparted from the line connecting the axes of said stationary gear member and said first driven gear, so that said first driven gear and said stationary gear member are closely approached, and the length of said gear housing member is shortened.

6. The bearing device of the bending and stretching type windshield wiper claimed in claim 2, wherein said bearing member is forcedly fitted on the outer periphery of the cylinder part of said gear housing member.

7. The bearing device of the bending and stretching type windshield wiper claimed in claim 2, wherein another bearing member of cylinder form is forcedly fitted in the inner periphery of the bearing hole of said stationary gear member.

8. The bearing device of the bending and stretching type windshield wiper claimed in claim 3, wherein another bearing member of cylinder form is forcedly fitted in the inner periphery of the bearing hole of said stationary gear member.

* * * * *